(12) United States Patent
Watanabe

(10) Patent No.: US 8,668,517 B2
(45) Date of Patent: Mar. 11, 2014

(54) PLUG APPARATUS

(75) Inventor: Hirotaka Watanabe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/144,934

(22) PCT Filed: Jun. 4, 2010

(86) PCT No.: PCT/JP2010/003740
§ 371 (c)(1),
(2), (4) Date: Jul. 18, 2011

(87) PCT Pub. No.: WO2011/151865
PCT Pub. Date: Dec. 8, 2011

(65) Prior Publication Data
US 2012/0115353 A1    May 10, 2012

(51) Int. Cl.
*H01R 31/08*    (2006.01)
(52) U.S. Cl.
USPC ........................................ 439/509; 200/51.02
(58) Field of Classification Search
USPC .......... 200/51.02, 51.07, 51.12, 42.02, 43.04, 200/61.19, 51.03, 51.04; 439/507–514
See application file for complete search history.

(56) References Cited

U.S. PATENT DOCUMENTS

| | | | |
|---|---|---|---|
| 6,851,970 B2 * | 2/2005 | Yamanashi | 439/509 |
| 7,153,157 B2 * | 12/2006 | Robinson et al. | 439/508 |
| 2007/0216226 A1 * | 9/2007 | Matsumoto et al. | 307/10.1 |

FOREIGN PATENT DOCUMENTS

| | | |
|---|---|---|
| JP | 2002-190288 | 7/2002 |
| JP | 2007-250472 | 9/2007 |
| JP | 2008-270121 | 11/2008 |
| JP | 2009-152053 | 7/2009 |
| JP | 2010-113888 | 5/2010 |

* cited by examiner

*Primary Examiner* — Felix O Figueroa
(74) *Attorney, Agent, or Firm* — Finnegan, Henderson, Farabow, Garrett & Dunner, LLP

(57) ABSTRACT

A plug apparatus has a first holding portion holding a stack connecting conductive wire, a second holding portion separated from the first holding portion and holding a stack connecting conductive wire, and a fixing portion to which the first and second holding portions and are removably fixed, wherein the first and second holding portions and are fixed to the fixing portion and the stack connecting conductive wires and are electrically connected to each other in a first state in which a plug grip is mounted, and the first and second holding portions and are allowed to separate from the fixing portion and the electrical connection between the stack connecting conductive wires and is broken in a second state in which the plug grip is dismounted.

5 Claims, 9 Drawing Sheets

FIG. 4
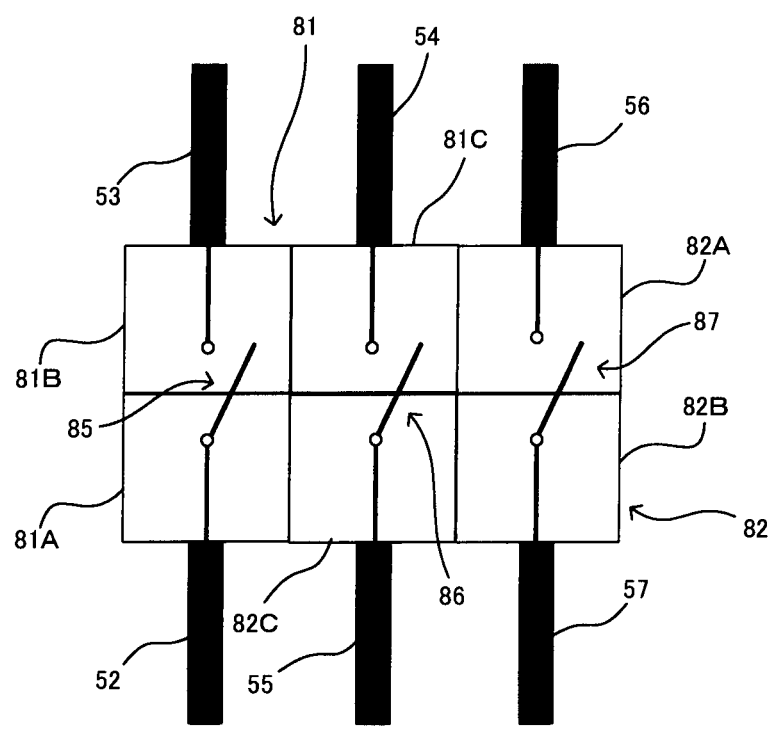
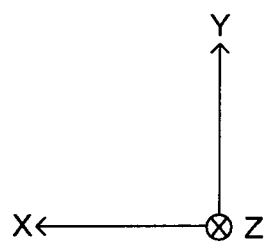

PLUG APPARATUS

CROSS-REFERENCE TO RELATED APPLICATION

This application is a national phase application of International Application No. PCT/JP2010/003740, filed Jun. 4, 2010, the contents of which are incorporated herein by reference.

TECHNICAL FIELD

The present invention relates to a plug apparatus for use in performing electrical connection and disconnection between power storage stacks.

BACKGROUND ART

In recent years, there has been a growing need to increase the output of a power storage apparatus used for a driving or auxiliary power source of an electric car, a hybrid car or the like. Patent Document 1 has disclosed a power source apparatus including a plurality of battery modules in which all of the battery modules are connected in series by placing a safety plug on a safety-plug connecting stage and the resulting series voltage is output from a power source output coupler.

PRIOR ART DOCUMENTS

Patent Documents

Patent Document 1 Japanese Patent Laid-Open No. 2007-250472
Patent Document 2 Japanese Patent Laid-Open No. 2009-152053

DISCLOSURE OF THE INVENTION

Problems to be Solved by the Invention

In replacing the battery module, however, the safety plug should be disconnected and then the circuits connected to the respective battery modules should be separated physically. Thus, it takes time and trouble to replace the battery module (power storage stack). To address this, it is an object of the present invention to improve the workability in replacing a power storage stack.

Means for Solving the Problems

To solve the abovementioned problem, a plug apparatus according to the present invention is (1) a plug apparatus on which a plug grip is removably mounted, the plug apparatus being used for connection between a first conductive wire provided for a first power storage stack and a second conductive wire provided for a second power storage stack, including a first holding portion holding the first conductive wire, a second holding portion separated from the first holding portion and holding the second conductive wire, and a fixing portion to which the first and second holding portions are removably fixed, wherein the first and second holding portions are fixed to the fixing portion and the first and second conductive wires are electrically connected to each other in a first state in which the plug grip is mounted, and the first and second holding portions are allowed to separate from the fixing portion and the electrical connection between the first and second conductive wires is broken in a second state in which the plug grip is dismounted.

(2) In the configuration of (1), the first power storage stack includes a first power storage block provided with a third conductive wire and a second power storage block provided with a fourth conductive wire, and the third and fourth conductive wires are electrically connected to each other in the first state and the electrical connection is broken in the second state. According to the configuration of (2), replacement work of the first power storage stack can be performed in the state in which the electrical connection between the first and second power storage blocks is broken.

(3) In the configuration of (2), the third and fourth conductive wires may be held by the first holding portion. According to the configuration of (3), the first, third, and fourth conductive wires can be removed collectively from the fixing portion in replacing the power storage stack, so that the replacement work can be facilitated.

(4) The configuration of (1) to (3) can be formed such that the first holding portion has a first switch portion for electrical continuity to the first conductive wire, the second holding portion has a second switch portion for electrical continuity to the second conductive wire, and electrical continuity between the first and second switch portions is made in the first state and the electrical continuity between the first and second switch portions is broken in the second state. According to the configuration of (4), the function of mechanically and electrically connecting and disconnecting the first and second power storage stacks is centralized in the first and second holding portions to simplify the structure.

(5) The configuration of (1) can be formed such that the fixing portion has a case including a fitting structure to which the first and second holding portions are fitted. The simple configuration can be used to perform the fitting and removal of the first and second holding portions.

Effect of the Invention

According to the present invention, the work of the replacement of the power storage stack can be facilitated.

BRIEF DESCRIPTION OF DRAWINGS

FIG. 4 An enlarged view of the first holding portion.

BEST MODE FOR CARRYING OUT THE INVENTION

Figure 1:
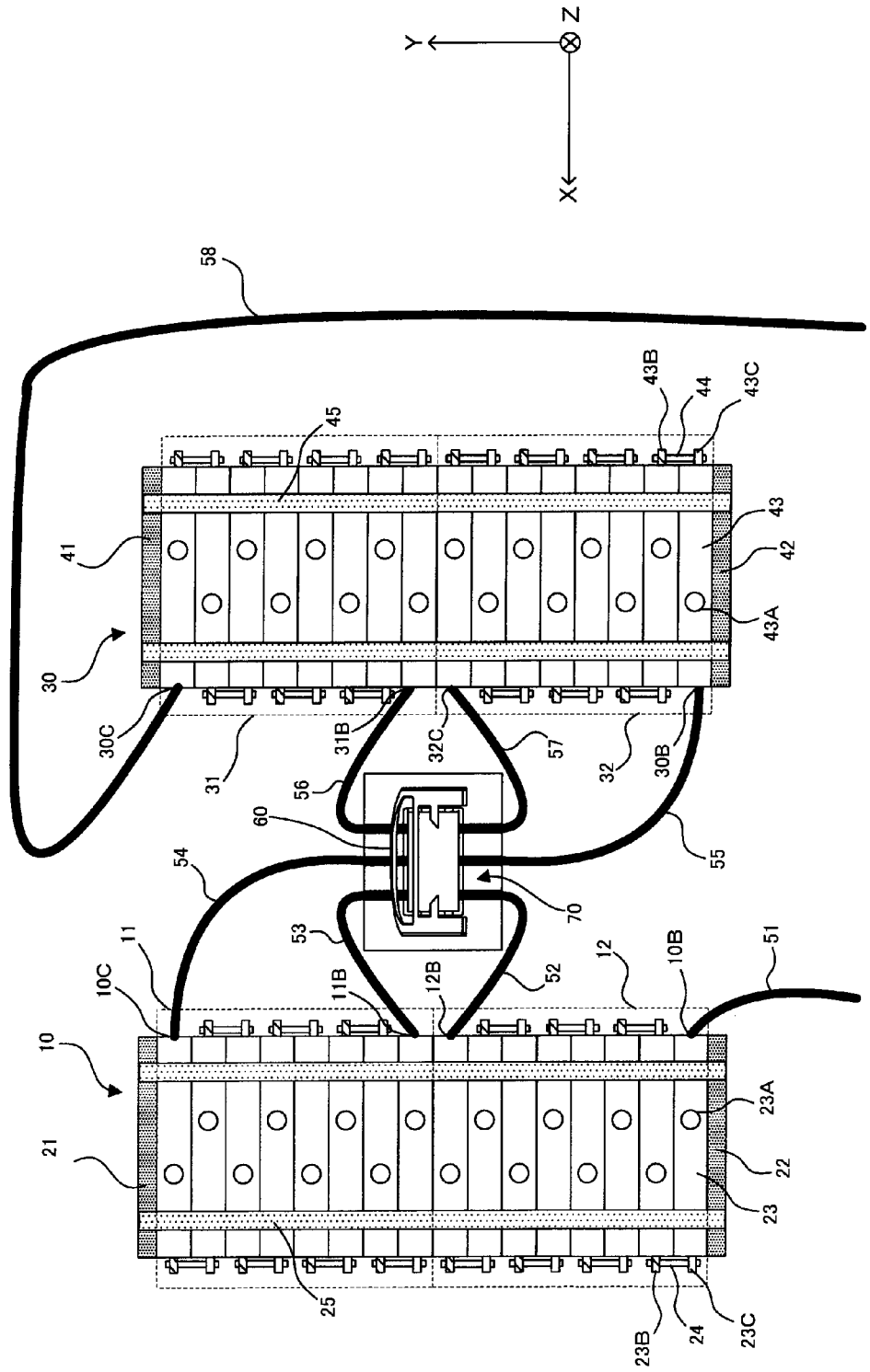
FIG. 1 A plan view of a plug apparatus and power storage stacks in a state in which a service plug grip is mounted.
Figure 2:
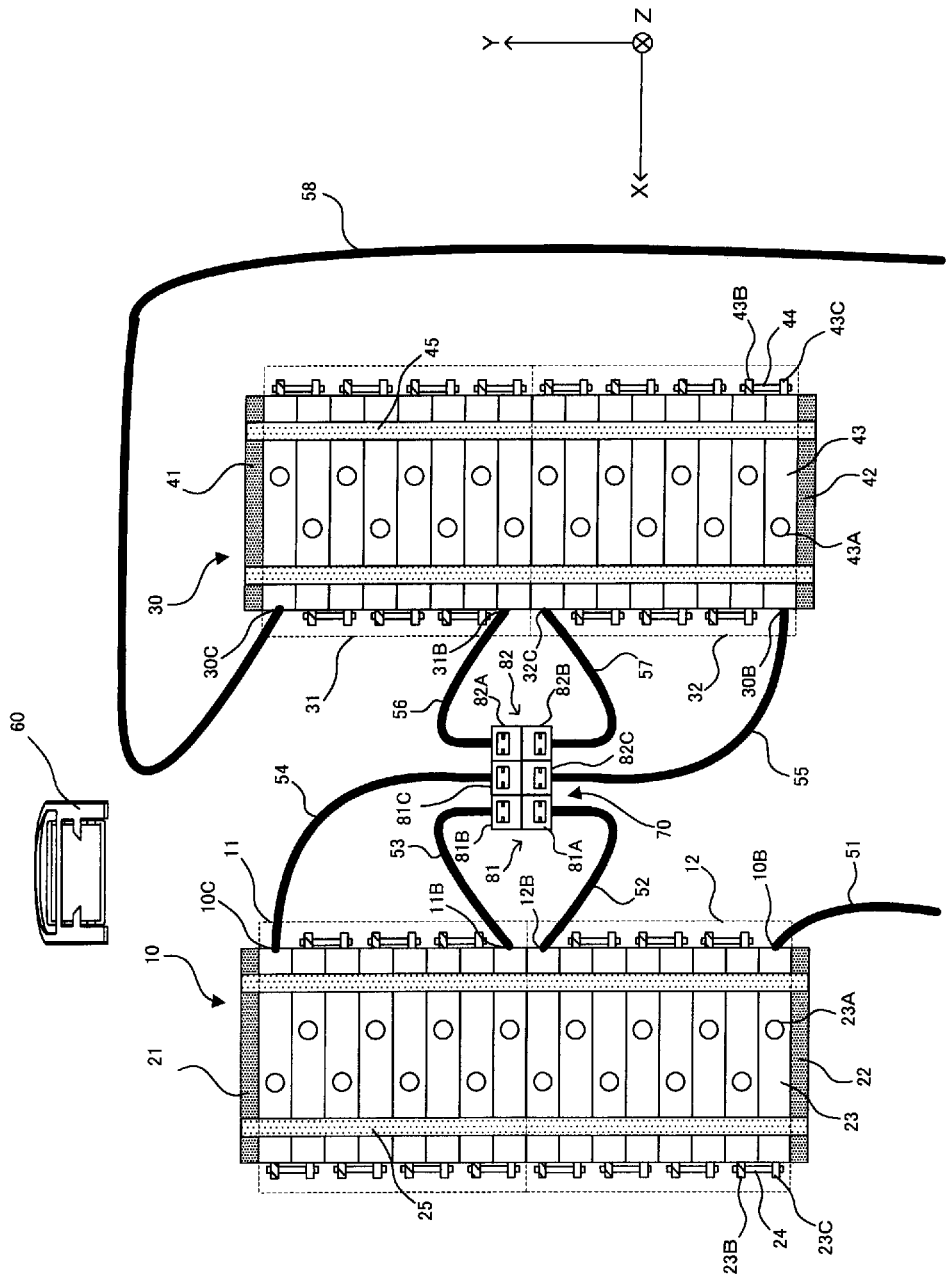
FIG. 2 A plan view of the plug apparatus and the power storage stacks in a state in which the service plug grip is dismounted.
Figure 3:
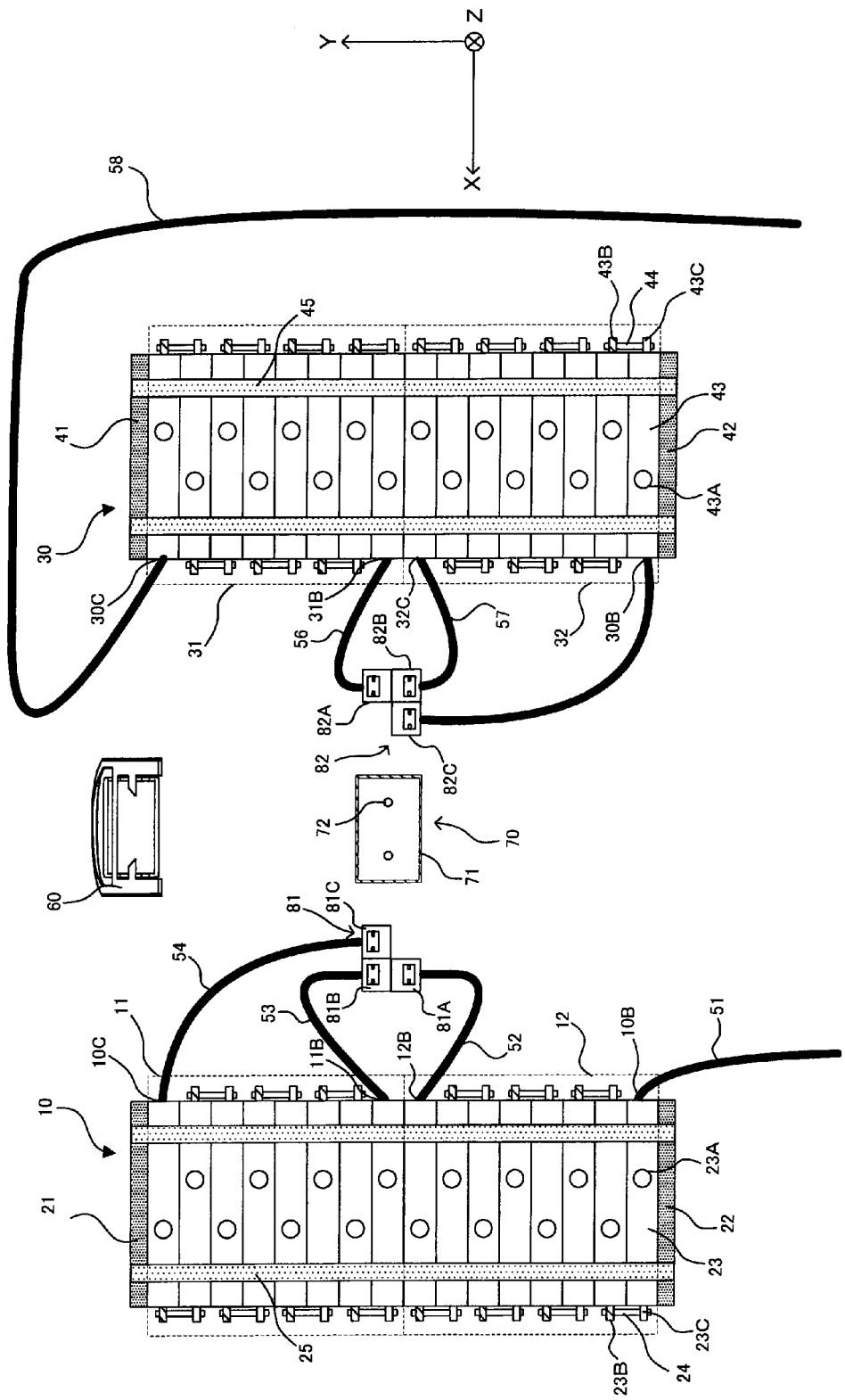
FIG. 3 A plan view of the power storage stacks in a state in which a first holding portion and a second holding portion are separated.

An embodiment of the present invention will be described with reference to the drawings. FIG. 1 is a plan view of a plug apparatus and power storage stacks and shows a state in which the plurality of power storage stacks are connected mechanically and electrically to each other. FIG. 2 is associated with FIG. 1 and shows a state in which the plurality of power storage stacks are connected mechanically but not connected electrically to each other. FIG. 3 is associated with FIG. 1 and shows a state in which the plurality of power storage stacks are not connected mechanically or electrically to each other. An X axis, a Y axis, and a Z axis represent three different axes orthogonal to each other. Referring to these figures, a power storage apparatus 1 includes a first power storage stack 10 and a second power storage stack 30.

The first power storage stack 10 includes a first power storage block 11 and a second power storage block 12. The first power storage stack 10 has a stack positive electrode terminal portion 10B and a stack negative electrode terminal portion 10C. The stack positive electrode terminal portion 10B is connected to a load portion including a three-phase alternating current motor, not shown, through a stack conductive wire 51. The stack negative electrode terminal portion 10C is connected electrically to the second power storage stack 30 through a stack connecting conductive wire 54 serving as a first conductive wire and a stack connecting conductive wire 55 serving as a second conductive wire.

The first and second power storage blocks 11 and 12 are located between end plates 21 and 22. The end plates 21 and 22 are coupled to each other by a restraint band 25. The restraint band 25 provides tensile force in a direction in which the end plates 21 and 22 are brought closer to each other. Thus, the first and second power storage blocks 11 and 12 are compressed by the end plates 21 and 22.

The first power storage block 11 includes a plurality of power storage elements 23. These power storage elements 23 are stacked in a direction (Y axis direction) in which the end plates 21 and 22 are opposed to each other. The power storage element 23 has an element positive electrode portion 23B at one end portion in the X axis direction and has an element negative electrode portion 23C at the other end portion. The power storage elements 23 arranged in the Y axis direction have the element positive electrode portions 23B and the element negative electrode portions 23C opposed to each other, and the opposite element positive electrode portion 23B and element negative electrode portion 23C are connected to each other through a bus bar (conductive plate) 24.

A gas discharge valve 23A is provided on an end face of the power storage element 23 in the Z axis direction. The gas discharge valve 23A may be a break-type valve. When an electrolyte solution is electrolyzed due to abnormal power storage to produce gas, the gas is discharged through the gas discharge valve 23A. This can suppress an increase in internal pressure of the power storage element 23.

The first power storage block 11 has a block connecting conductive wire 53 serving as a third conductive wire for electrical connection to the second power storage block 12 and the stack connecting conductive wire 54 for electrical connection between the first power storage stack 10 and the second power storage stack 30. In the state shown in FIG. 1, the block connecting conductive wire 53 has one end portion connected electrically to a block connecting conductive wire 52 serving as a fourth conductive wire and the other end portion connected mechanically and electrically to a block positive electrode portion 11B.

The second power storage block 12 has the stack conductive wire 51 and the block connecting conductive wire 52. In the state shown in FIG. 1, the block connecting conductive wire 52 has one end portion connected to the block connecting conductive wire 53 and the other end portion connected to a block positive electrode portion 12B. Since the other configuration of the second power storage block 12 is similar to that of the first power storage block 11, repetitive description is not performed.

The second power storage stack 30 includes a third power storage block 31 and a fourth power storage block 32. The second power storage stack 30 has a stack positive electrode terminal 30B and a stack negative electrode terminal 30C. The stack positive electrode terminal 30B is connected electrically to the first power storage stack 10 through the stack connecting conductive wires 55 and 54. The stack negative electrode terminal 30C is connected to the load portion through a stack conductive wire 58.

The third power storage block 31 has a block positive electrode portion 31B. A block connecting conductive wire 56 for electrical connection to the fourth power storage block 32 is connected to the block positive electrode portion 31B. The fourth power storage block 41 has a block negative positive portion 32C. A block connecting conductive wire 57 for electrical connection to the third power storage block 31 is connected to the block negative electrode portion 32C.

Next, description is made of a fixing structure for fixing the first and second power storage stacks with reference to FIGS. 2 and 3. An end portion of the block connecting conductive wire 52 is held by a holding block 81A. An end portion of the block connecting conductive wire 53 is held by a holding block 81B. The holding blocks 81A and 81B have end faces in the Y axis direction coupled mechanically to each other. An end portion of the stack connecting conductive wire 54 is held by a holding block 81C. The holding blocks 81B and 81C have end faces in the X axis direction coupled mechanically to each other.

The holding blocks 81A, 81B, and 81C are coupled mechanically to each other to be unitized into a first holding portion 81. Each of the holding blocks 81A, 81B, and 81C is formed to have a rectangular shape in plan view (viewed from the Z axis direction), and the first holding portion 81 is formed to have the shape of a letter L in plan view.

An end portion of the block connecting conductive wire 56 is held by a holding block 82A. An end portion of the block connecting conductive wire 57 is held by a holding block 82B. The holding blocks 82A and 82B have end faces in the Y axis direction coupled mechanically to each other. An end portion of the stack connecting conductive wire 55 is held by a holding block 82C. The holding blocks 82B and 82C have end faces in the X axis direction coupled mechanically to each other. Thus, the holding blocks 82A, 82B, and 82C are mechanically coupled to be unitized into a second holding portion 82. Each of the holding blocks 82A, 82B, and 82C is formed to have a rectangular shape in plan view, and the second holding portion 82 is formed to have the shape of a letter L in plan view.

FIG. 4 is an enlarged view of the first holding portion 81 and shows the configuration of switches in a simplified manner. Referring to FIGS. 2, 3, and 4, the block connecting conductive wires 52 and 53 are switched between electrical continuity and non-continuity by a block connecting switch 85, the stack connecting conductive wires 54 and 55 are switched between electrical continuity and non-continuity by a stack connecting switch 86, and the block connecting conductive wires 56 and 57 are switched between electrical continuity and non-continuity by a block connecting switch 87. The stack connecting switch 86 corresponds to first and second switch portions.

A service plug grip 60 is mounted on the first and second holding portions 81 and 82 placed in a fixing portion 70 to set the block connecting switch 85, the stack connecting switch 86, and the block connecting switch 87 in an electrically continuous state. The service plug grip 60 is dismounted from the first and second holding portions 81 and 82 fixed to the fixing portion 70 to switch the block connecting switch 85, the stack connecting switch 86, and the block connecting switch 87 from the electrically continuous state to an electrically non-continuous state.

Figure 5A:
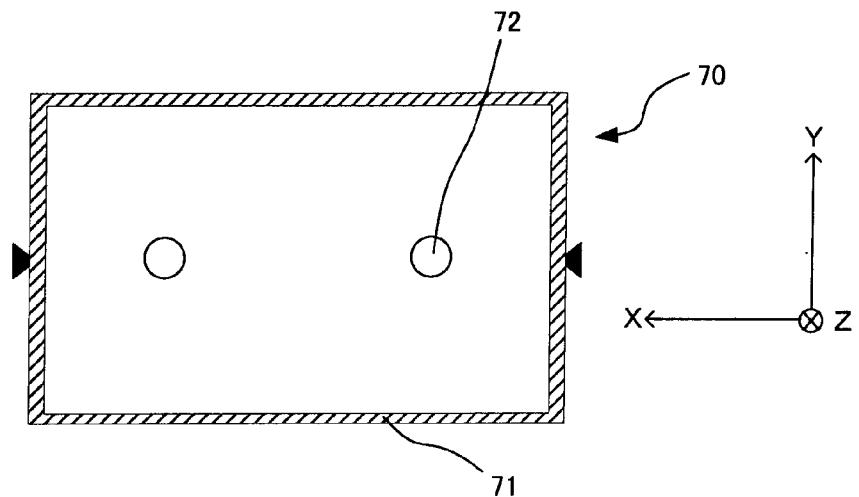
FIG. 5A A plan view (diagram viewed from a Z direction) of a fixing portion.
Figure 5B:
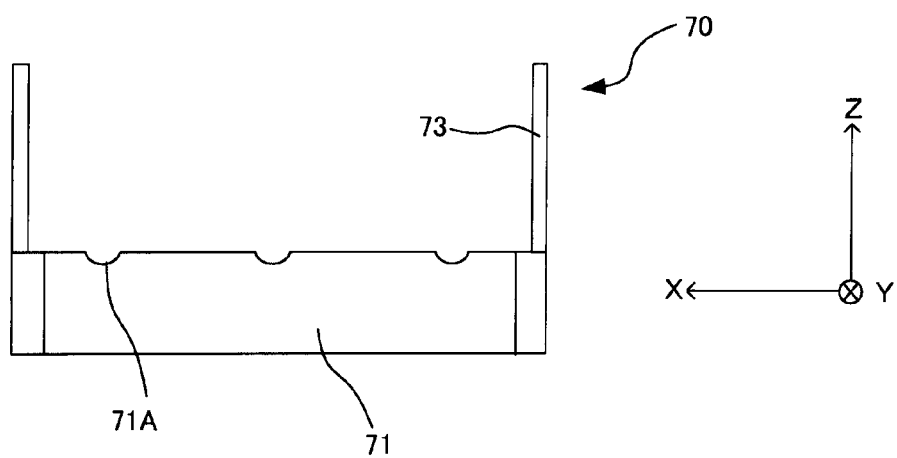
FIG. 5B A diagram of the fixing portion viewed from a Y direction.
Figure 5C:
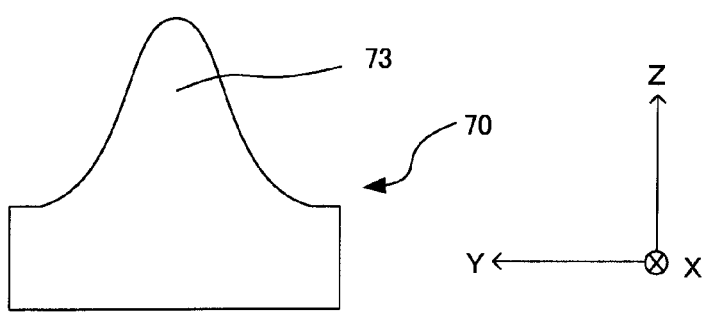
FIG. 5C A diagram of the fixing portion viewed from an X direction.

FIG. 5A is a plan view of the fixing portion 70 (diagram viewed from the Z direction), FIG. 5B is a diagram of the fixing portion 70 viewed from the Y direction, and FIG. 5C is a diagram of the fixing portion 70 viewed from the X direction. Referring to FIG. 5, the fixing portion 70 includes a case 71. The case 71 has a bottomed cylindrical shape and is opened on its upper side. The fixing portion 70 is fixed to a lower case, not shown, by fastening bolts 72.

The lower case is located on a lower side of the power storage apparatus mounted on a vehicle and is fixed to an upper case, not shown, to cover the lower side of the power storage apparatus. A protrusive portion 73 extending in the Z axis direction is formed at each end face of the case 71 in the X axis direction. The protrusive portion 73 is formed to have a parabolic shape when viewed from the X axis direction. A plurality of recess portions 71A are formed in an end face of the case 71 in the Y axis direction. The recess portions 71A are formed side by side in the X axis direction such that the block connecting conductive wires 52 to 57 and the stack connecting conductive wires 54 and 55 are placed therein in surface contact therewith.

The first holding portion 81 is fitted to the case 71. In a state in the first holding portion 81 is fitted to the case 71, the first holding portion 81 is removably locked at the position by a lock portion, not shown. The lock portion may be a hook portion which is engaged in a hole portion formed in the first holding portion 81. In this case, the hook portion may be elastically deformed in fitting and removal to allow locking and unlocking. Alternatively, it is possible to employ a configuration in which a hole portion is formed in the case 71 and the first holding portion 81 is provided with a protruding portion which is removably press-fitted into the hole portion. In addition, it is possible to use a configuration in which the first holding portion 81 is fitted to and brought into frictional contact with the case 71 so that the first holding portion 81 is fixed. It is also possible to employ a configuration in which the first holding portion 81 is slid along a rail formed on the case 71 and then fitted in the case 71. In this case, the configuration may include a lock mechanism for enabling and disabling the sliding of the first holding portion 81 located in the case 71.

Next, description is made of a method of removing the first and second holding portions 81 and 82 from the fixing portion 70 with reference to FIGS. 1 to 3. In the state shown in FIG. 1, the service plug grip 60 is mounted on the first and second holding portions 81 and 82 to provide electrical continuity between the block connecting conductive wires 52 and 53, electrical continuity between the stack connecting conductive wires 54 and 55, and electrical continuity between the block connecting conductive wires 56 and 57.

When one of the first and second power storage stacks 10 and 30 experiences a failure, the service plug grip 60 shown in FIG. 1 is pulled out of the first and second holding portions 81 and 82. Referring to FIG. 2, when the service plug grip 60 is pulled out of the first and second holding portions 81 and 82, the electrical continuity between the block connecting conductive wires 52 and 53 is broken, the electrical continuity between the stack connecting conductive wires 54 and 55 is broken, and the electrical continuity between the block connecting conductive wires 56 and 57 is broken.

Thus, the electrical connection of the first to fourth power storage blocks 11 to 32 is broken merely by pulling the service plug grip 60 out of the first and second holding portions 81 and 82. The cost can be reduced since it is not necessary to provide the service plug grip 60 for each of the connecting portion between the block connecting conductive wires 52 and 53, the connecting portion between the stack connecting conductive wires 54 and 55, and the connecting portion between the block connecting conductive wires 56 and 57. In addition, the number of the service plug grip 60 is reduced, thereby preventing a user from forgetting to disconnect the service plug grip 60 in replacing the power storage stack. The number of the service plug grip 60 is reduced, thereby reducing the size of the power storage apparatus.

When the service plug grip 60 is pulled out of the first and second holding portion 81 and 82, the first and second holding portions 81 and 82 are exposed to the outside. Referring to FIG. 3, the first holding portion 81 fitted to the case 71 can be pulled in the Z axis direction to unlock the case 71 and the first holding portion 81, so that the first holding portion 81 can be removed from the fixing portion 70. The second holding portion 82 fitted to the case 71 can be pulled in the Z axis direction to unlock the case 71 and the second holding portion 82, so that the second holding portion 82 can be removed from the fixing portion 70.

In this manner, the service plug grip 60 is merely pulled out of the first and the second holding portions 81 and 82 to make the first and second holding portions 81 and 82 ready to separate from each other. Thus, when one of the first and second power storage stacks 10 and 30 experiences a failure, the other can be reused. This results in improvement of rebuilding capability, that is, reusability which achieves a cost reduction. In addition, the efforts in replacement of the power storage stack can be lessened.

Another method is contemplated in which, when one of the first and second power storage stacks 10 and 30 experiences a failure, both of the power storage stacks 10 and 30 are replaced, that is, the whole power storage apparatus is replaced. This method, however, leads to an increase in replacement cost as a more battery capacity is required, or as the number of power storage stacks is increased. According to the embodiment described above, the cost can be reduced since the replacement can be performed for each of the power storage stacks.

While the six holding blocks and the two holding portions are used in the above embodiment, the present invention is not limited thereto and changes may be made as appropriate depending on the configuration or the number of the power storage stacks and the power storage blocks. Specific example thereof will hereinafter be described as modifications.

(Modification 1)

Figure 6:
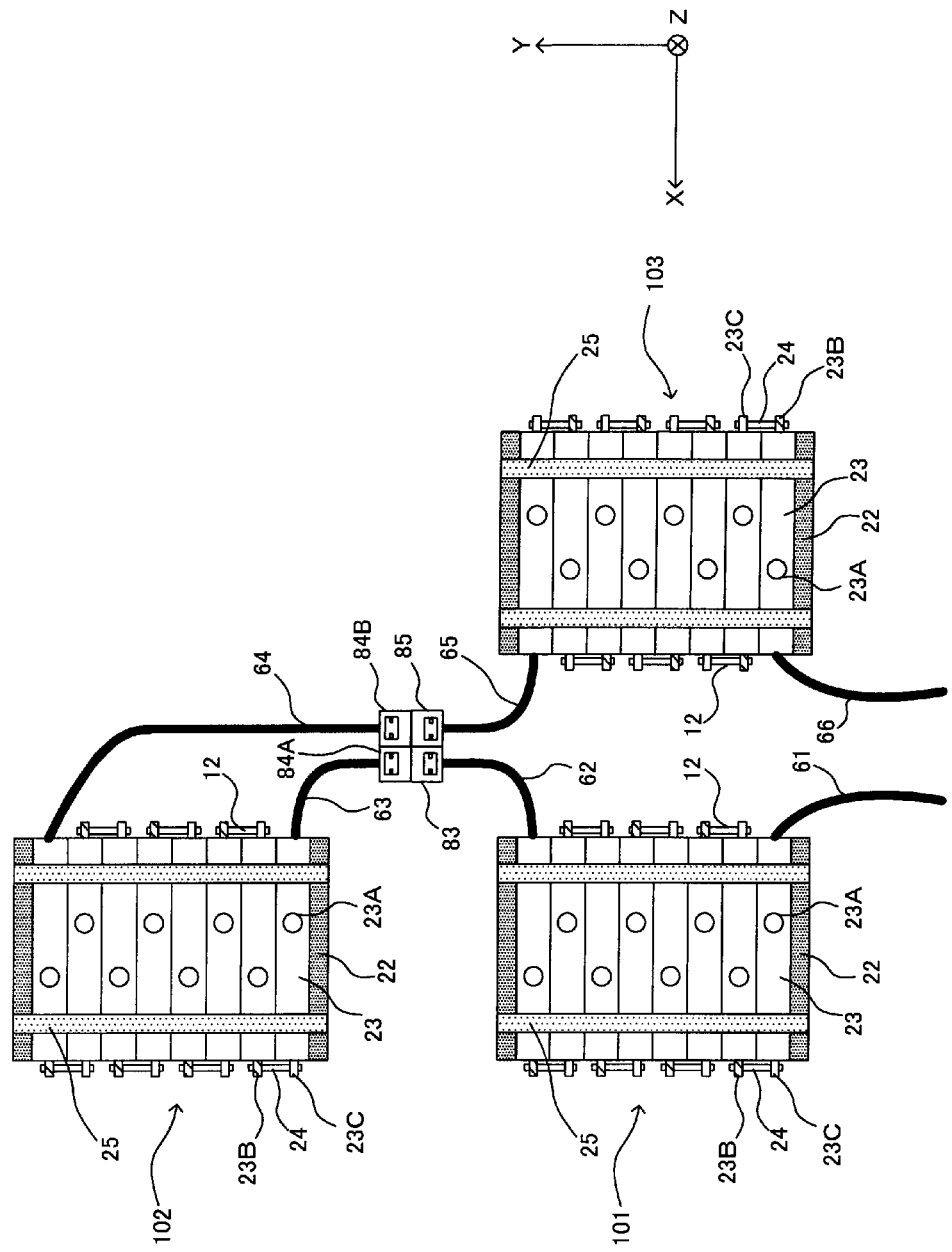
FIG. 6 A plan view of a plug apparatus and power storage stacks in Modification 1 and shows a state in which a service plug grip is dismounted.
Figure 7:
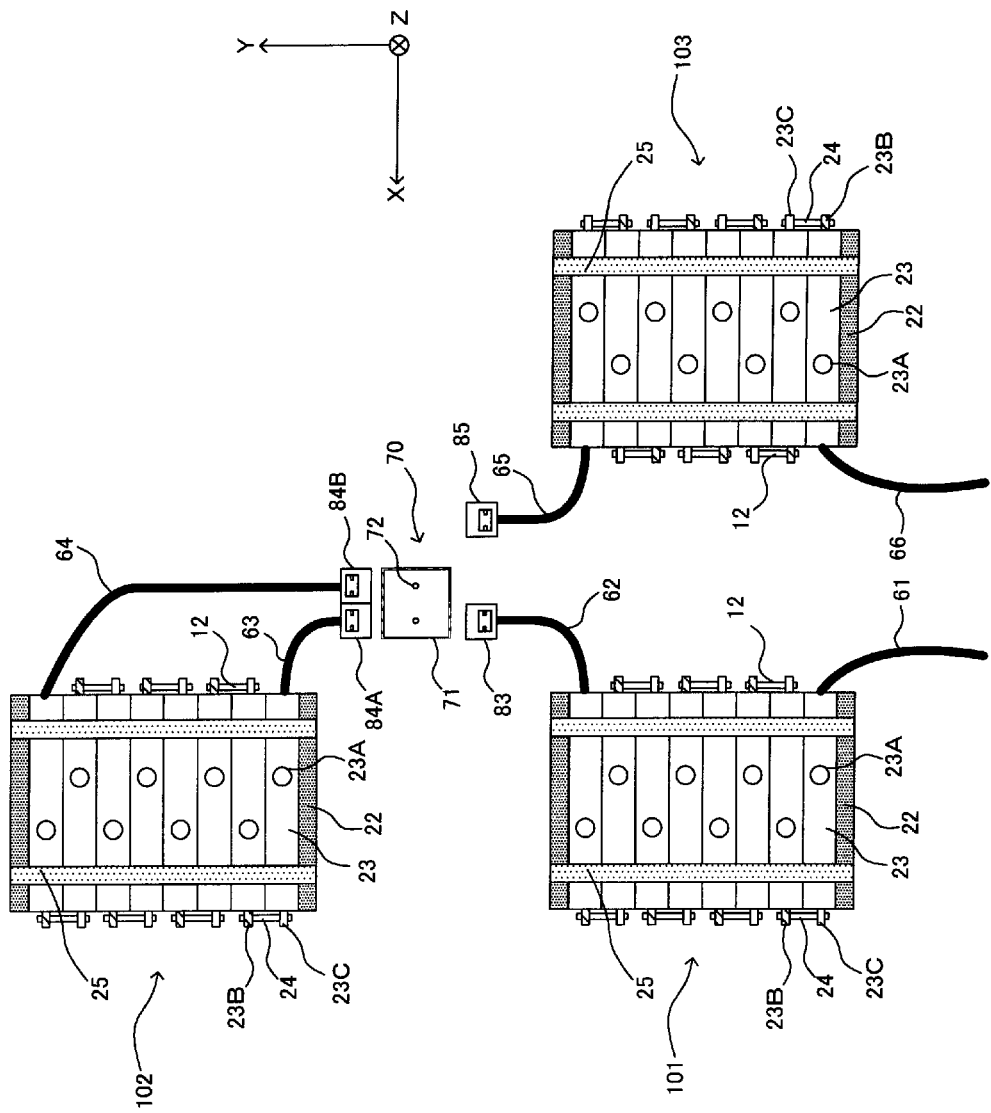
FIG. 7 A plan view of the power storage stacks in a state in which a plurality of holding portions are separated in Modification 1.

FIGS. 6 and 7 show a power storage apparatus of Modification 1. FIG. 6 shows a state in which power storage stacks are fixed to a fixing portion. FIG. 7 shows a state in which the power storage stacks are removed from the fixing portion. Components having the same functions as those in Embodiment 1 are designated with the same reference numerals. The power storage apparatus of the present modification includes first to third power storage stacks 101 to 103. The power storage stack of the present modification differs from that of the above embodiment in that the stack consists of one power storage block. A stack conductive wire 61 is electrically connected to a positive terminal of the power storage apparatus and a stack conductive wire 66 is electrically connected to a negative terminal.

A stack connecting conductive wire 62 is connected to a negative terminal of the first power storage stack 101, and an end portion of the stack connecting conductive wire 62 is held by a first holding block 83. A stack connecting conductive wire 63 is connected to a positive terminal of the second power storage stack 102, and an end portion of the stack connecting conductive wire 63 is held by a second holding block 84A. A stack connecting conductive wire 64 is connected to a negative terminal of the second power storage stack 102, and an end portion of the stack connecting conductive wire 64 is held by a third holding block 84B. A stack connecting conductive wire 65 is connected to a positive terminal of the third power storage stack 103, and an end portion of the stack connecting conductive wire 65 is held by a fourth holding block 85.

The first holding block 83, the second and third holding blocks 84A and 84B, and the fourth holding block 85 can be separated from each other. The second and third holding blocks 84A and 84B have end faces in an X axis direction connected to each other such that they cannot be separated. In the configuration of Modification 1, a service plug grip 60 is removed from the first to fourth holding blocks 83 to 85 to break electrical continuity between the stack connecting conductive wires 62 and 63 and electrical continuity between the stack connecting conductive wires 64 and 65. In addition, the removal makes the first holding block 83, the second and third holding blocks 84A and 84B, and the fourth holding block 85 ready to separate from each other. According to the configuration of Modification 1, the same effects as those in Embodiment 1 described above can be achieved.

(Modification 2)

Figure 8:
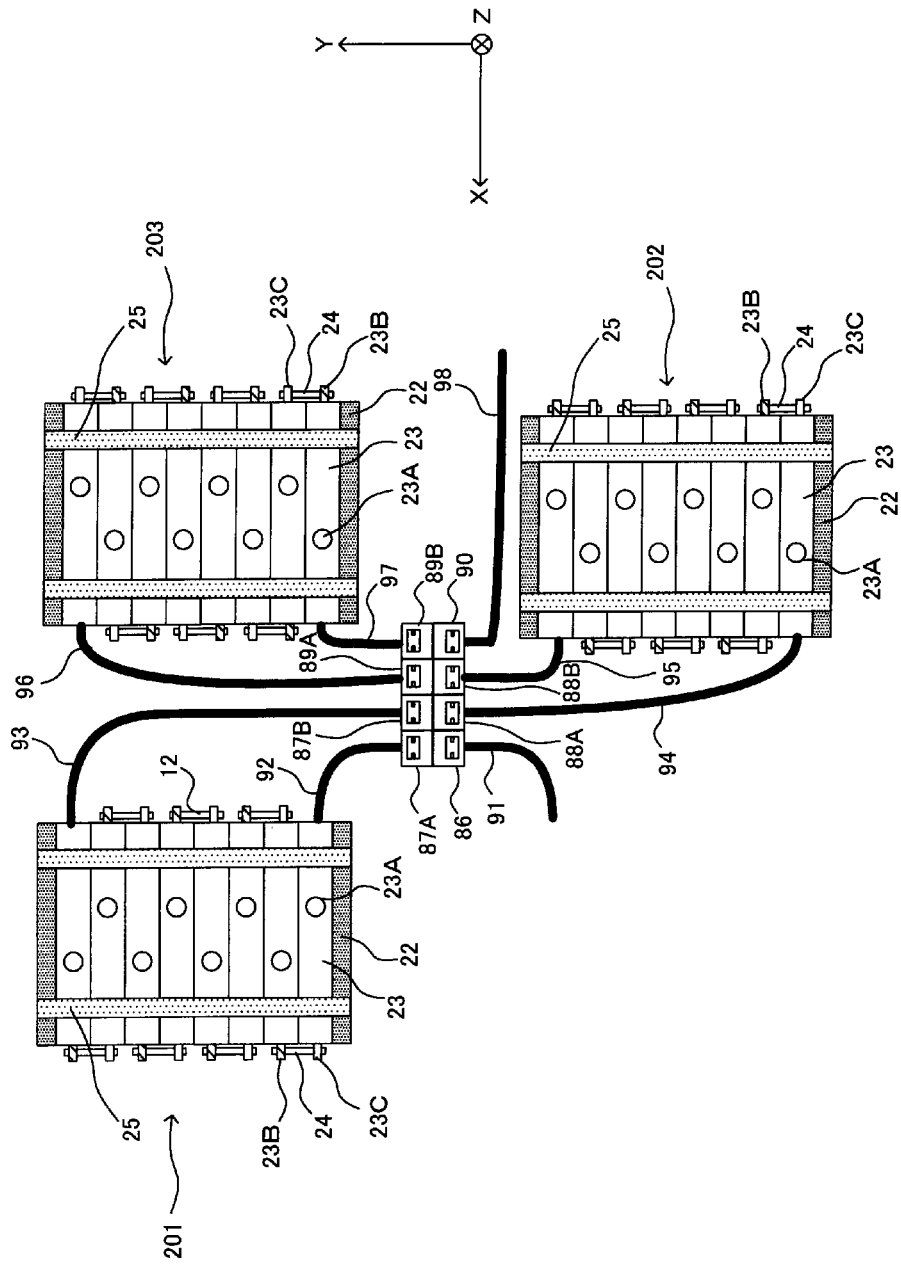
FIG. 8 A plan view of a plug apparatus and power storage stacks in Modification 2 and shows a state in which a service plug grip is dismounted.
Figure 9:
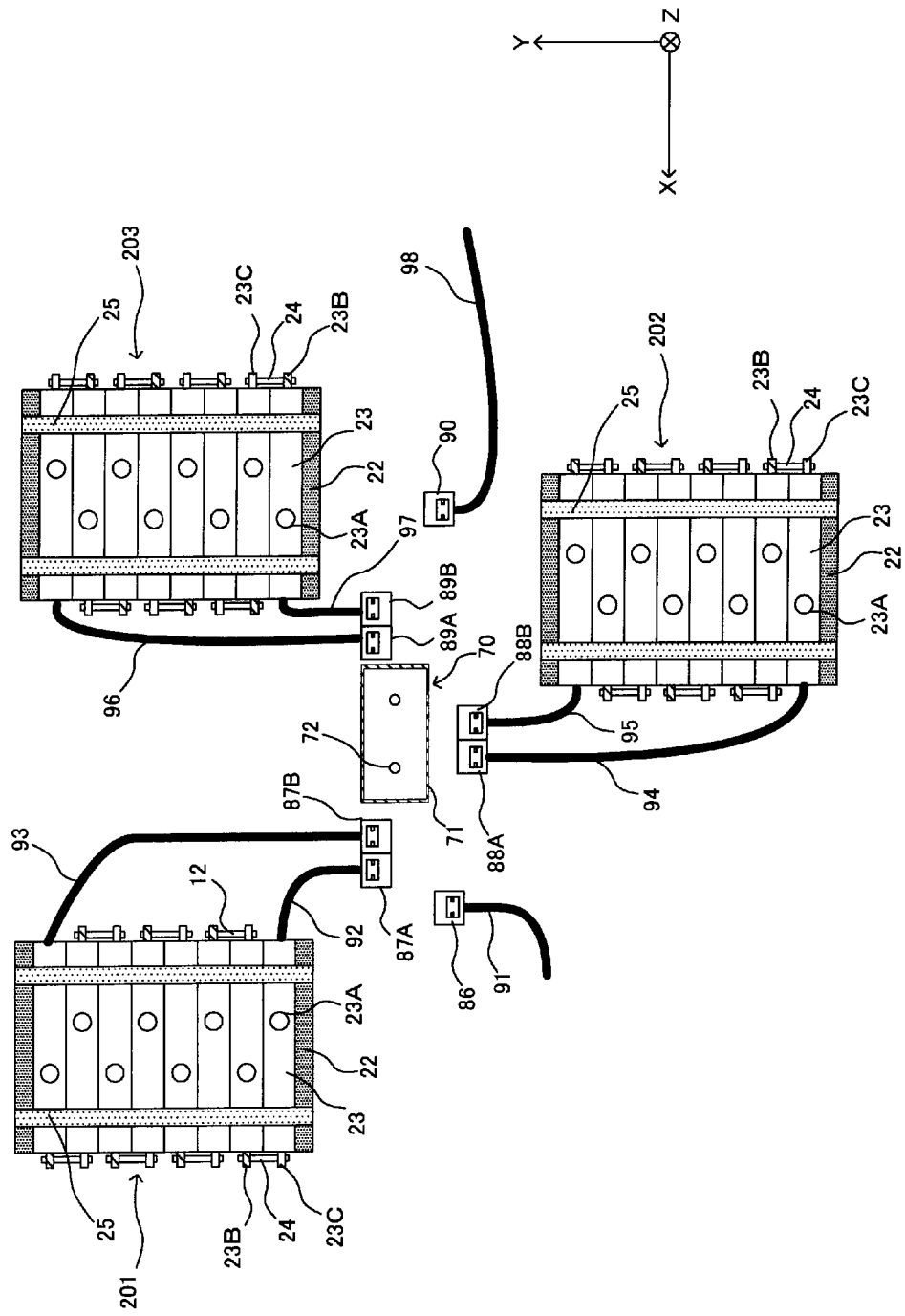
FIG. 9 A plan view of the power storage stacks in a state in which a plurality of holding portions are separated in Modification 2.

FIGS. 8 and 9 show a power storage apparatus of Modification 2. FIG. 8 shows a state in which power storage stacks are fixed to a fixing portion. FIG. 9 shows a state in which the power storage stacks are removed from the fixing portion. Components having the same functions as those in Embodiment 1 are designated with the same reference numerals. The power storage apparatus of the present modification includes first to third power storage stacks 201 to 203. The power storage stack of the present modification differs from that of the above embodiment in that the stack consists of one power storage block.

A stack conductive wire 92 is connected to a positive terminal of the power storage apparatus, and a stack conductive wire 97 is connected to a negative terminal. Load conductive wires 91 and 98 are connected to a load portion including a three-phase alternating current motor, not shown. End portions of the load conductive wires 91 and 98 are held by first and eighth holding blocks 86 and 90, respectively. A stack connecting conductive wire 93 is connected to a negative terminal of the first power storage stack 201, and a stack connecting conductive wire 94 is connected to a positive terminal of the second power storage stack 202. An end portion of the stack connecting conductive wire 93 is held by a third holding block 87B and an end portion of the stack connecting conductive wire 94 is held by a fourth holding block 88A.

A stack connecting conductive wire 95 is connected to a negative terminal of the second power storage stack 202, and a stack connecting conductive wire 96 is connected to a positive terminal of the third power storage stack 203. An end portion of the stack connecting conductive wire 95 is held by a fifth holding block 88B, and an end portion of the stack connecting conductive wire 96 is held by a sixth holding block 89A. A negative terminal of the third power storage stack 203 is connected to the stack conductive wire 97, and an end portion of the stack conductive wire 97 is held by a seventh holding block 89B.

The first holding block 86, the second and third holding blocks 87A and 87B, the fourth and fifth holding blocks 88A and 88B, and the sixth and seventh holding blocks 89A and 89B can be separated from each other. The second and third holding blocks 87A and 87B cannot be separated from each other. The third and fourth holding blocks 88A and 88B cannot be separated from each other. The fourth and fifth holding blocks 89A to 89B cannot be separated from each other.

In the configuration of Modification 2, a service plug grip 60 is removed from the first to eighth holding blocks 86 to 90 to break electrical continuity between the load conductive wire 91 and the stack conductive wire 92, electrical continuity between the stack conducting connectors 93 and 94, electrical continuity between the stack conducting connector 95 and 96, electrical continuity between the stack conducting connector 97 and 98. In addition, the removal makes the first holding block 86, the second and third holding blocks 87A and 87B, the fourth and fifth holding blocks 88A and 88B, and the sixth and seventh holding blocks 89A and 89B ready to separate from each other. According to the configuration of Modification 2, the same effects as those in Embodiment 1 described above can be achieved.

DESCRIPTION OF REFERENCE NUMERALS

10 FIRST POWER STORAGE STACK 11 FIRST POWER STORAGE BLOCK 12 SECOND POWER STORAGE BLOCK 60 SERVICE PLUG GRIP 70 FIXING PORTION 81 FIRST HOLDING PORTION 82 SECOND HOLDING PORTION

The invention claimed is:

1. A plug apparatus on which a plug grip is removably mounted, the plug apparatus being used for connection between a first conductive wire provided for a first power storage stack and a second conductive wire provided for a second power storage stack, comprising:
   a first holding portion holding the first conductive wire;
   a second holding portion separated from the first holding portion and holding the second conductive wire; and
   a fixing portion on which the first and second holding portions are removably mounted and which is previously fixed,
   wherein the first and second holding portions are mounted onto the fixing portion from above the fixing portion, and include uncovered parts exposed above the fixing portion, and the first and second conductive wires are electrically connected to each other in a first state in which the plug grip is attached to the uncovered parts exposed above the fixing portion, and
   the first and second holding portions are allowed to separate from the fixing portion and the electrical connection between the first and second conductive wires is broken in a second state in which the plug grip is removed from the first and second holding portions.

2. The plug apparatus according to claim 1, wherein the first power storage stack includes a first power storage block provided with a third conductive wire and a second power storage block provided with a fourth conductive wire, and the third and fourth conductive wires are electrically connected to each other in the first state and the electrical connection is broken in the second state.

3. The plug apparatus according to claim 2, wherein the first holding portion holds the third and fourth conductive wires.

4. The plug apparatus according to claim 1, wherein the first holding portion has a first switch portion for electrical continuity to the first conductive wire, the second holding portion has a second switch portion for electrical continuity to the second conductive wire, and electrical continuity between the first and second switch portions is made in the first state and the electrical continuity between the first and second switch portions is broken in the second state.

5. The plug apparatus according to claim 1, wherein the fixing portion has a case including a fitting structure to which the first and second holding portions are fitted.

\* \* \* \* \*